United States Patent [19]

Boller

[11] Patent Number: 5,730,273
[45] Date of Patent: Mar. 24, 1998

[54] ACTUATING APPARATUS FOR TIPPING A COMPONENT

[75] Inventor: Manfred Boller, Hohentengen, Germany

[73] Assignee: Grapha-Holding AG, Hergiswil, Switzerland

[21] Appl. No.: 466,036

[22] Filed: Jun. 6, 1995

[30] Foreign Application Priority Data

Jun. 8, 1994 [CH] Switzerland ............... 1798/94

[51] Int. Cl.⁶ .................................................. B65G 47/46
[52] U.S. Cl. .................... 198/370.04; 198/802; 209/912
[58] Field of Search .................. 198/367, 370.03, 198/370.04, 802; 209/648, 707, 911, 912

[56] References Cited

U.S. PATENT DOCUMENTS

| | | | |
|---|---|---|---|
| 3,510,014 | 5/1970 | Speaker et al. | 198/370.04 X |
| 4,787,498 | 11/1988 | Males et al. | 198/802 X |
| 5,335,767 | 8/1994 | Killer et al. | 198/370.04 |
| 5,348,132 | 9/1994 | Maier | 198/370.04 |

FOREIGN PATENT DOCUMENTS

| | | |
|---|---|---|
| WO93/07972 | 4/1993 | European Pat. Off. . |
| 0 540 464 A2 | 5/1993 | European Pat. Off. . |
| 9009944 | 9/1990 | WIPO ............... 198/370.04 |

Primary Examiner—Tuan Nguyen
Attorney, Agent, or Firm—Spencer & Frank

[57] ABSTRACT

A tipping arrangement in a sorting system includes a carriage body, a shaft connected to the carriage body, a projection secured to the carriage body, and a component pivotally connected to the shaft to be tippable out of a locked base position into at least one tipped position. An actuating apparatus is provided for tipping the component and includes at least one resilient yoke having a first end rigidly secured to the component, and a second end displaceable within a limited range relative to the component. The yoke includes a latching lug defining a stop surface and being located between the first end and the second end. The stop surface engages with the projection for latching the yoke to lock the component in the locked base position. At least one actuating rod is hinged to the second end of the yoke. The at least one actuating rod unlatches the yoke and tips the component into the tipped position.

14 Claims, 5 Drawing Sheets

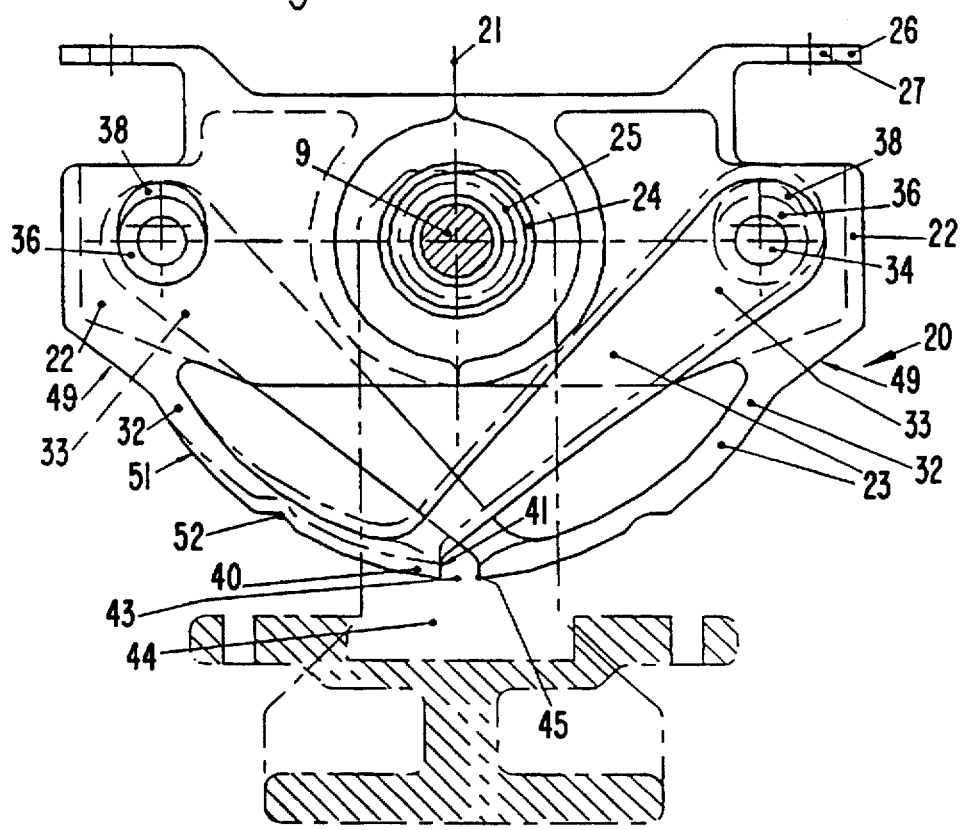

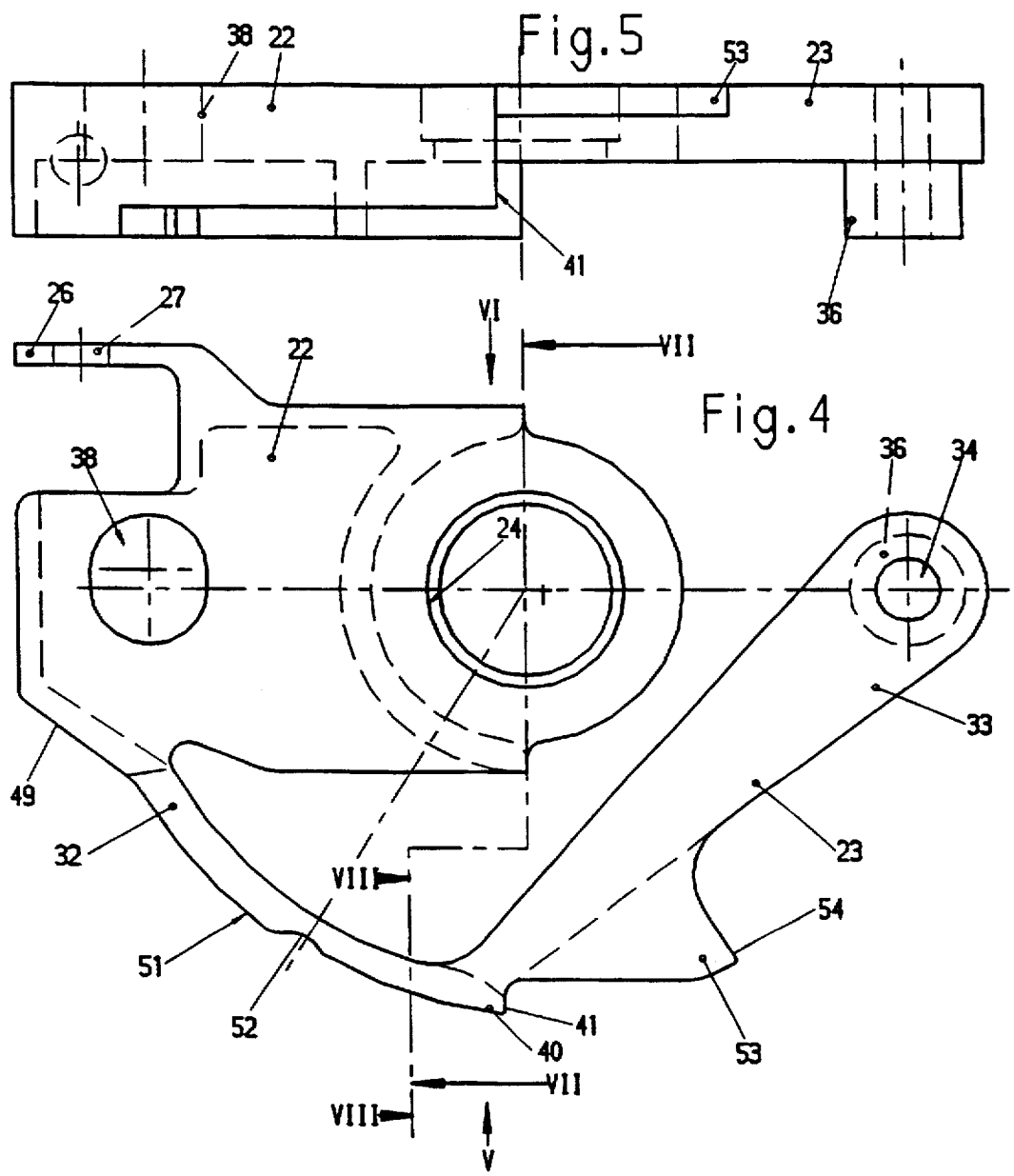

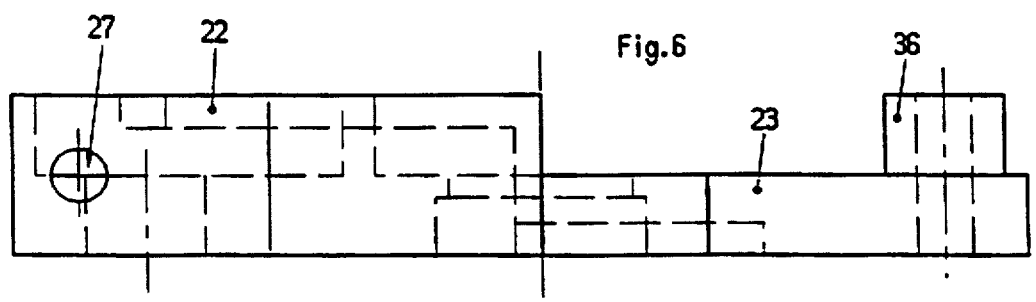
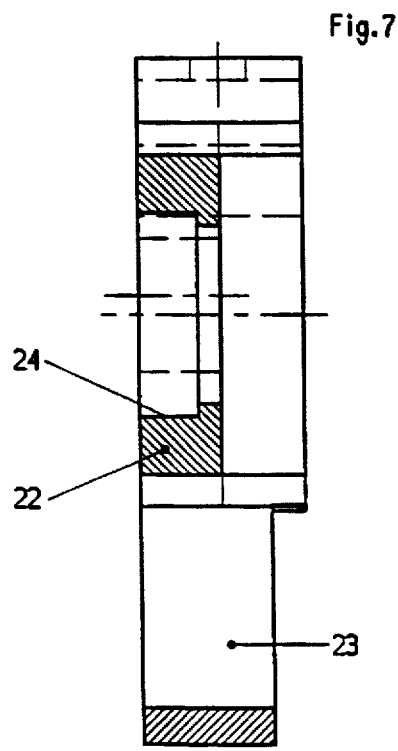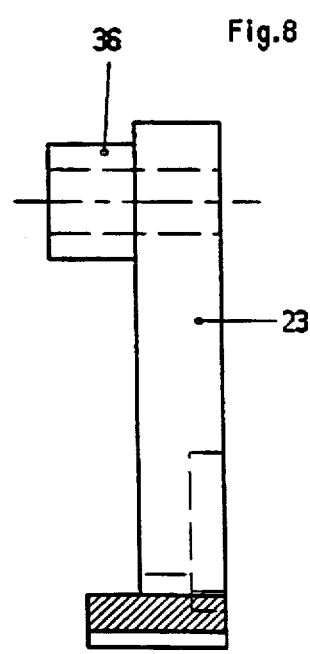

ACTUATING APPARATUS FOR TIPPING A COMPONENT

CROSS-REFERENCE TO RELATED APPLICATION

This application claims the priority of patent application Ser. No. 01 798/94-1, filed Jun. 8, 1994, in Switzerland, the subject matter of which is incorporated herein by reference.

BACKGROUND OF THE INVENTION

An apparatus for sorting piece goods that includes a plurality of carriages coupled together to form a carriage chain is known from European Application 540 464 (which corresponds to U.S. Pat. No. 5,335,767). Each carriage has a tray for receiving the piece goods. The tray can be pivoted out of a locked, horizontal base position at a selected receiving station into a tipped position using two push rods and an actuating apparatus. The actuation of the push rods causes the locking mechanism to be released, and then causes the tray to be tipped. This actuating apparatus performs well in practice. However, it is costly to produce because of the numerous necessary individual parts.

SUMMARY OF THE INVENTION

It is an object of the present invention to provide an apparatus of the above-mentioned type that can be produced in a cost-effective manner.

The above object and other objects are accomplished according to the invention by providing a tipping arrangement in a sorting system, including: a carriage body; a shaft connected to the carriage body; a projection secured to the carriage body; a component pivotally connected to the shaft to be tippable out of a locked base position into at least one tipped position; an actuating apparatus for tipping the component, and comprising at least one resilient yoke having a first end rigidly secured to the component, and a second end displaceable within a limited range relative to the component, the yoke including a latching lug defining a stop surface and being located between the first end and the second end, the stop surface engaging with the projection for latching the yoke to lock the component in the locked base position; and at least one actuating rod hinged to the second end of the yoke for unlatching the yoke to tip the component into the at least one tipped portion.

BRIEF DESCRIPTION OF THE DRAWINGS

These and other features and advantages of the invention will be further understood from the following detailed description of the preferred embodiment with reference to the accompanying drawings, in which:

FIG. 3 is a schematic representation of the carrier illustrating the range of motion of the yoke.

FIG. 4 is a plan illustration of the carrier and yoke.

FIG. 5 is a front elevational illustration as viewed in the direction of arrow V from FIG. 4.

FIG. 6 is a rear elevational illustration as viewed in the direction of arrow VI from FIG. 4.

FIGS. 7 and 8 are sectional illustrations of the carrier and yoke as viewed along lines VII—VII and VIII—VIII, respectively, in FIG. 4.

DETAILED DESCRIPTION OF THE PREFERRED EMBODIMENTS

Figure 1:
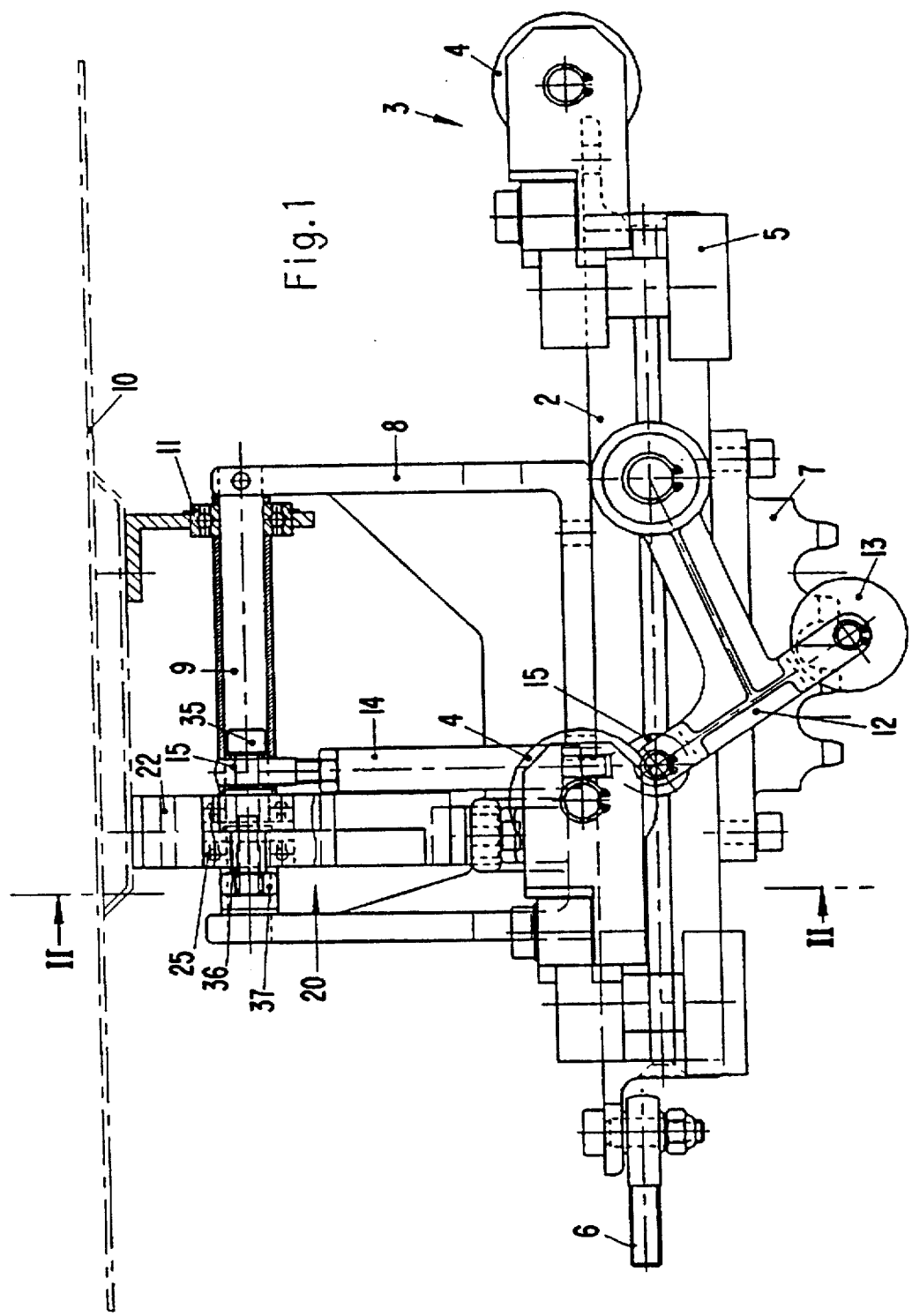
FIG. 1 shows a side view of a carriage for a sorting system.
Figure 2:
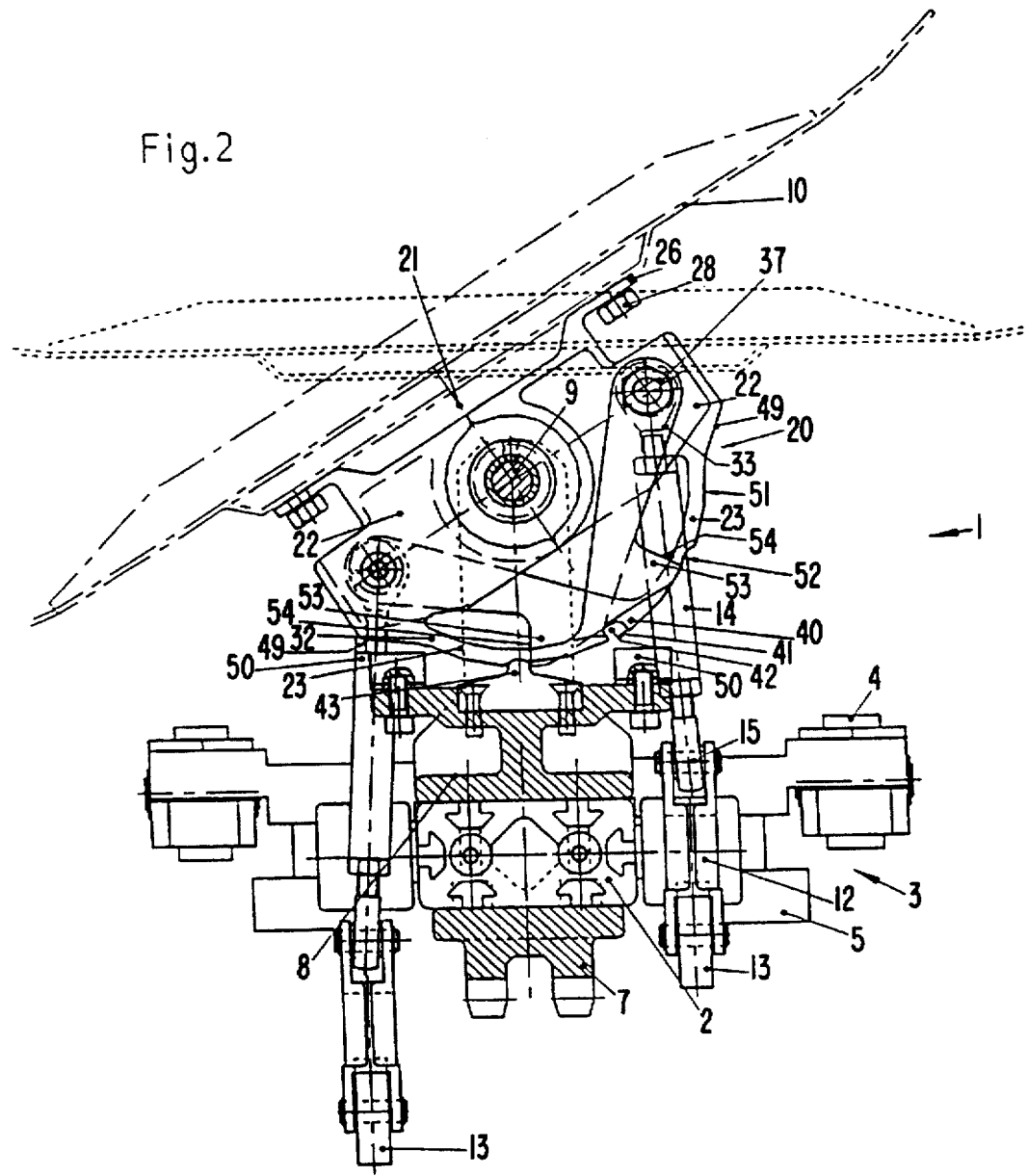
FIG. 2 is a cross-sectional illustration taken along line II—II in FIG. 1.

A carriage 1 of a sorting system is represented in FIGS. 1 and 2. A carriage body 2 has a running mechanism 3 mounted thereto that includes running rollers 4 and side guide rollers 5 that travel on rails, not shown. Adjacent carriages 1 are coupled to one another via articulated rods 6 to form a carriage train. At its bottom, the carriage body 2 has a toothed rack 7 that engages a circulating chain (not shown) for driving the carriage chain.

A U-shaped carrier 8 is mounted to the carriage body 2 and supports a shaft 9 that extends in the longitudinal direction of the carriage. A component, such as a tray 10, is pivotally seated on shaft 9 using ball bearings 11. Tray 10 supports the piece goods.

A pivot arm 12 is pivotally seated on each side of the carriage body 2. Pivotally disposed at the bottom of each pivot arm 12 is an actuating roller 13, which moves along a switching cam track (not shown) causing a push rod 14 to be pushed upwardly. Each push rod 14 has spherical bearings 15 on each end.

The two push rods 14 act on a locking and actuating apparatus 20 comprising two identical carriers 22 disposed centrally symmetrically with respect to a vertical axis 21 extending perpendicularly through shaft 9. Referring also to FIGS. 3 through 8, these carriers comprise formed-on, resilient yokes 23 composed of plastic, preferably polypropylene. The two carriers 22 and their respective yokes 23 are partially offset axially with respect to one another. At their centers, the carriers 22 have coaxial bores 24. Ball bearings 25 are pushed onto the shaft 9, and inserted into the coaxial bores 24.

At their top, the carriers 22 have laterally-projecting flanges 26 provided with throughgoing bores 27. The tray 10 is screwed onto the carriers 22 using screws 28 inserted through the bores 27.

Each yoke 23 has a first end 32 formed on one side of the carrier, and an opposite, second end 33. Second end 33 has a cylindrical, throughgoing bore 34 extending through a cylindrical projection 36. A threaded journal pin 35 is inserted through the cylindrical projection 36 by way of bore 34, and is secured with a nut 37. Threaded journal pin 35 supports the top spherical bearing 15 of push rod 14.

The projection 36 of one carrier 22 projects through a slot 38 disposed in the other carrier 22 and that extends in an upward direction. In a base position of the yoke 23, the projection 36 lies against a lower edge of slot 38 with a slight prestress.

A latching lug 40 is provided at the bottom of each yoke 23. Latching lug 40 has a stop surface 41 that is vertical in the base position. The stop surfaces 41 of the two yokes 23 together form a groove 42, which surrounds a projection 43 in the base position. The projection 43 is formed on a plastic body 44 that is screwed to the U-shaped carrier 8. The projection 43 is cylindrical or prismatic, and has a vertical stop surface 45 on two opposite sides, against which the stop surfaces 41 lie when the yoke 23 is in the base position, so that tray 10 is locked in a horizontal position.

When one of the actuating rollers 13 runs onto a switching cam track, the corresponding push rod 14 pushes the affected yoke end 33 upwardly, counter to a spring force of the yoke 23, until the cylindrical projection 36 stops against an upper edge of the slot 38. In the process, a portion of yoke 23 adjacent to first end 32 moves resiliently, so that the latching lug 40 is raised above the projection 43. This releases the latching lug 40, and as the push rod 14 is pushed higher, the tray 10 is pivoted about shaft 9. A planar surface 49 adjacent to yoke end 32 stops against a rubber cushion 50, so that the pivoting movement is gently and quietly braked.

The outer surface 51 of the yoke 23 is bow-shaped between the stop surface 41 and the first end 32, and can include a latching notch 52 that engages with the projection 43 for latching yoke 23 in the tipped position. This secures the carrier in the tipped position. In addition to, or instead of the latching notch, the outer surface of yoke 23 can have a projection 53 located between the stop surface 41 and the second end 33. The projection 53 can have a stop surface 54 that lies in a plane that includes the shaft 9 and is oriented in the same general direction as stop surface 41. Projection 53 of the non-actuated yoke 23 latches behind the projection 43 when the carrier is in the tipped position, so that tray 10 is locked in the tipped position.

To return tray 10 to the base position, the lowered actuating roller 13 runs onto, for example, a fixed cam track, causing push rod 14 to be moved in an upward direction. This resiliently moves the relevant yoke 23, so that the projection 53 is raised above the projection 43, causing this locking mechanism to release and, as the roller 13 is lifted higher, causing tray 10 to return to its base position, whereby the two latching lugs 40 latch the projection 43 to lock the tray 10.

If desired, the latching notch 52 and the projection 53 can be omitted, and the outer surface 51 can be configured so that a portion of the yoke 23 between the latching lug 40 and the first end 32 deflects progressively when the tray 10 is tipped. In this instance, the tray 10 can automatically pivot out of the tipped position into the base position as soon as the relevant actuating roller 13 runs off of the relevant cam track.

The region of progressive deflection can be limited to the latching lug 40 in the immediate vicinity of the stop surface 41, which limits the automatic pivoting of the tray 10 into the locked base position to an angular range of, for example, 2° to 10°. The outer surface 51 adjacent to the stop surface 41 can be provided with a slight spiral shape (not shown), with a distance from an axis of rotation increasing as the distance from the stop surface 41 increases.

If tray 10 need only be tipped to one side, that is, if all receiving stations are disposed on the same side of the carriage chain, the apparatus can be correspondingly simplified by providing only one carrier 22 having a yoke 23, with an additional stop surface 41 (not shown) being securely formed on this carrier 22.

It will be understood that the above description of the present invention is susceptible to various modifications, changes and adaptations, and the same are intended to be comprehended within the meaning and range of equivalents of the appended claims.

What is claimed is:

1. A tipping arrangement in a sorting system, comprising:
   a carriage body;
   a shaft connected to said carriage body;
   a projection secured to said carriage body;
   a component pivotally connected to said shaft to be tippable out of a locked base position into at least one tipped position;
   an actuating apparatus for tipping said component, and comprising:
      at least one resilient yoke having a first end rigidly secured to said component, and a second end displaceable within a limited range relative to said component, said yoke including a latching lug defining a stop surface and being located between the first end and the second end, the stop surface engaging with said projection for latching said yoke to lock said component in the locked base position; and
      at least one push rod hinged to the second end of said yoke and being actuatable for unlatching said yoke to tip said component into the at least one tipped position.

2. The carriage as defined in claim 1, wherein said at least one resilient yoke comprises two resilient yokes each disposed symmetrically with respect to a vertical axis, the latching lugs of the respective resilient yokes together forming a groove for accommodating said projection when said component is in the locked base position.

3. The carriage as defined in claim 1, wherein at least one of said yoke and said projection are comprised of plastic.

4. The carriage as defined in claim 3, wherein the plastic comprises polypropylene.

5. The carriage as defined in claim 1, wherein said yoke is formed on a carrier secured to said component and rotatably seated on said shaft.

6. The carriage as defined in claim 2, wherein said at least one push rod comprises two push rods each including a journal pin attached to an end thereof, each said yoke being formed on a respective carrier secured to said component and rotatably seated on said shaft and having a slot extending in a direction essentially corresponding to a longitudinal direction of the push rods and being located on a respective one side of said shaft at a distance therefrom; each respective journal pin extending through the second end of a respective one yoke, and extending through the slot of the respective other yoke.

7. The carriage as defined in claim 1, wherein said yoke has a bow shape between the first end and the latching lug.

8. The carriage as defined in claim 7, wherein each yoke includes a latching notch that engages with said projection to latch said component in the tipped position.

9. The carriage as defined in claim 1, wherein a portion of said yoke located between the first end and the latching lug is progressively deflectable when said component is tipped out of the base position for automatically tipping said component back into the base position when the push rod is not actuated.

10. The carriage as defined in claim 9, wherein said yoke deflects to a maximum angle of 10°.

11. The carriage as defined in claim 9, wherein the portion is located in a region of the latching lug.

12. The carriage as defined in claim 1, wherein said component comprises a tray.

13. The carriage as defined in claim 1, wherein said yoke defines an additional stop surface that latches behind said projection for locking said component in the tipped position.

14. The carriage as defined in claim 1, further comprising an actuating roller and a pivot lever supporting said actuating roller; wherein said push rod is pivotally connected to said pivot lever.

* * * * *